(12) United States Patent
Maier et al.

(10) Patent No.: US 8,414,692 B2
(45) Date of Patent: Apr. 9, 2013

(54) DENSITY-BASED COMPACT SEPARATOR

(75) Inventors: William C. Maier, Almond, NY (US); Gocha Chochua, Sugar Land, TX (US)

(73) Assignee: Dresser-Rand Company, Olean, NY (US)

( * ) Notice: Subject to any disclaimer, the term of this patent is extended or adjusted under 35 U.S.C. 154(b) by 399 days.

(21) Appl. No.: 12/877,177

(22) Filed: Sep. 8, 2010

(65) Prior Publication Data

US 2011/0061536 A1    Mar. 17, 2011

Related U.S. Application Data (60) Provisional application No. 61/242,645, filed on Sep. 15, 2009.

(51) Int. Cl.
*B01D 45/12* (2006.01)

(52) U.S. Cl. ............... 95/271; 55/423; 55/447; 55/449; 55/461; 55/466; 95/272

(58) Field of Classification Search ............. 55/423, 55/447, 449, 461, 466; 95/271, 272
See application file for complete search history.

(56) References Cited

U.S. PATENT DOCUMENTS

| | | |
|---|---|---|
| 815,812 A | 3/1906 | Gow |
| 1,057,613 A | 4/1913 | Baldwin |
| 1,061,656 A | 5/1913 | Black |
| 1,480,775 A | 1/1924 | Marien |
| 1,622,768 A | 3/1927 | Cook et al. |
| 1,642,454 A | 9/1927 | Malmstrom |
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,602,462 A | 7/1952 | Ralph A. Barrett |
| 2,811,303 A | 10/1957 | Ault et al. |

(Continued)

FOREIGN PATENT DOCUMENTS

| | | |
|---|---|---|
| CA | 2647511 | 10/2007 |
| EP | 301285 | 10/1991 |

(Continued)

OTHER PUBLICATIONS

PCT/US2007/008149 International Preliminary Report on Patentability dated Sep. 30, 2008.

(Continued)

*Primary Examiner* — Robert A Hopkins
(74) *Attorney, Agent, or Firm* — Edmonds & Nolte, PC (57) ABSTRACT

Apparatus and method for separating a fluid. The apparatus includes an inlet duct having an inlet flow entrance and an inlet flow exit, the inlet duct defining an inlet width that decreases between the inlet flow entrance and the inlet flow exit, and an inlet radius that increases between the inlet flow entrance and the inlet flow exit. The apparatus also includes a separating turn fluidly connected to the inlet flow exit of the inlet duct and including an outer surface defining an opening. The apparatus further includes a liquid outlet fluidly connected to the opening of the separating turn to allow a higher-density component of the flow to exit the separating turn, and an outlet duct having an outlet flow entrance connected to the separating turn, to allow a lower-density component of the flow to exit the separating turn.

20 Claims, 4 Drawing Sheets

U.S. PATENT DOCUMENTS

| | | |
|---|---|---|
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 3,044,657 A | 7/1962 | Horton |
| 3,191,364 A | 6/1965 | Sylvan |
| 3,198,214 A | 8/1965 | Lorenz |
| 3,204,696 A | 9/1965 | De Priester et al. |
| 3,213,794 A | 10/1965 | Adams |
| 3,220,245 A | 11/1965 | Van Winkle |
| 3,273,325 A | 9/1966 | Gerhold |
| 3,352,577 A | 11/1967 | Medney |
| 3,395,511 A | 8/1968 | Akerman |
| 3,420,434 A | 1/1969 | Swearingen |
| 3,431,747 A | 3/1969 | Hasheimi et al. |
| 3,454,163 A | 7/1969 | Read |
| 3,487,432 A | 12/1969 | Jenson |
| 3,490,209 A | 1/1970 | Fernandes et al. |
| 3,500,614 A | 3/1970 | Soo |
| 3,578,342 A | 5/1971 | Satterthwaite et al. |
| 3,628,812 A | 12/1971 | Larralde et al. |
| 3,672,733 A | 6/1972 | Arsenius et al. |
| 3,814,486 A | 6/1974 | Schurger |
| 3,829,179 A | 8/1974 | Kurita et al. |
| 3,915,673 A | 10/1975 | Tamai et al. |
| 3,975,123 A | 8/1976 | Schibbye |
| 4,033,647 A | 7/1977 | Beavers |
| 4,059,364 A | 11/1977 | Anderson et al. |
| 4,078,809 A | 3/1978 | Garrick et al. |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson et al. |
| 4,146,261 A | 3/1979 | Edmaier et al. |
| 4,165,622 A | 8/1979 | Brown, Jr. |
| 4,174,925 A | 11/1979 | Pfenning et al. |
| 4,182,480 A | 1/1980 | Theyse et al. |
| 4,197,990 A | 4/1980 | Carberg et al. |
| 4,205,927 A | 6/1980 | Simmons |
| 4,227,373 A | 10/1980 | Amend et al. |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,333,748 A | 6/1982 | Erickson |
| 4,334,592 A | 6/1982 | Fair |
| 4,336,693 A | 6/1982 | Hays et al. |
| 4,339,923 A | 7/1982 | Hays et al. |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman et al. |
| 4,391,102 A | 7/1983 | Studhalter et al. |
| 4,396,361 A | 8/1983 | Fraser |
| 4,432,470 A | 2/1984 | Sopha |
| 4,438,638 A | 3/1984 | Hays et al. |
| 4,441,322 A | 4/1984 | Ritzi |
| 4,442,925 A | 4/1984 | Fukushima et al. |
| 4,453,893 A | 6/1984 | Hutmaker |
| 4,463,567 A | 8/1984 | Amend et al. |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox et al. |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West et al. |
| 4,648,806 A | 3/1987 | Alexander |
| 4,687,017 A | 8/1987 | Danko et al. |
| 4,737,081 A | 4/1988 | Nakajima et al. |
| 4,752,185 A | 6/1988 | Butler et al. |
| 4,807,664 A | 2/1989 | Wilson et al. |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otterman |
| 5,024,585 A | 6/1991 | Kralovec |
| 5,043,617 A | 8/1991 | Rostron |
| 5,044,701 A | 9/1991 | Watanabe et al. |
| 5,045,046 A | 9/1991 | Bond |
| 5,054,995 A | 10/1991 | Kaseley et al. |
| 5,064,452 A | 11/1991 | Yano et al. |
| 5,080,137 A | 1/1992 | Adams |
| 5,190,440 A | 3/1993 | Maier et al. |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,246,346 A | 9/1993 | Schiesser |
| 5,285,123 A | 2/1994 | Kataoka et al. |
| 5,306,051 A | 4/1994 | Loker et al. |
| 5,337,779 A | 8/1994 | Fukuhara |
| 5,378,121 A | 1/1995 | Hackett |
| 5,385,446 A | 1/1995 | Hays |
| 5,421,708 A | 6/1995 | Utter |
| 5,443,581 A | 8/1995 | Malone |
| 5,484,521 A | 1/1996 | Kramer |
| 5,496,394 A | 3/1996 | Nied |
| 5,500,039 A | 3/1996 | Mori et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,575,309 A | 11/1996 | Connell |
| 5,585,000 A | 12/1996 | Sassi |
| 5,605,172 A | 2/1997 | Schubert et al. |
| 5,628,623 A | 5/1997 | Skaggs |
| 5,634,492 A | 6/1997 | Steinruck et al. |
| 5,640,472 A | 6/1997 | Meinzer et al. |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,750,040 A | 5/1998 | Hays |
| 5,775,882 A | 7/1998 | Kiyokawa et al. |
| 5,779,619 A | 7/1998 | Borgstrom et al. |
| 5,795,135 A | 8/1998 | Nyilas et al. |
| 5,800,092 A | 9/1998 | Nill et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,899,435 A | 5/1999 | Mitsch et al. |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane et al. |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,980,218 A | 11/1999 | Takahashi et al. |
| 5,988,524 A | 11/1999 | Odajima et al. |

| | | | | | | |
|---|---|---|---|---|---|---|
| 6,035,934 A | 3/2000 | Stevenson et al. | 7,204,241 B2 | 4/2007 | Thompson | |
| 6,059,539 A | 5/2000 | Nyilas et al. | 7,241,392 B2 | 7/2007 | Maier | |
| 6,068,447 A | 5/2000 | Foege | 7,244,111 B2 | 7/2007 | Suter et al. | |
| 6,090,174 A | 7/2000 | Douma et al. | 7,258,713 B2 | 8/2007 | Eubank et al. | |
| 6,090,299 A | 7/2000 | Hays et al. | 7,270,145 B2 | 9/2007 | Koezler | |
| 6,113,675 A | 9/2000 | Branstetter | 7,288,202 B2 | 10/2007 | Maier | |
| 6,122,915 A | 9/2000 | Hays | 7,314,560 B2 | 1/2008 | Yoshida et al. | |
| 6,123,363 A | 9/2000 | Burgard et al. | 7,323,023 B2 | 1/2008 | Michele et al. | |
| 6,145,844 A | 11/2000 | Waggott | 7,328,749 B2 | 2/2008 | Reitz | |
| 6,149,825 A | 11/2000 | Gargas | 7,335,313 B2 | 2/2008 | Moya | |
| 6,151,881 A | 11/2000 | Ai et al. | 7,377,110 B2 | 5/2008 | Sheridan et al. | |
| 6,196,962 B1 | 3/2001 | Purvey et al. | 7,381,235 B2 | 6/2008 | Koene et al. | |
| 6,206,202 B1 | 3/2001 | Galk et al. | 7,396,373 B2 | 7/2008 | Lagerstedt et al. | |
| 6,214,075 B1 | 4/2001 | Filges et al. | 7,399,412 B2 | 7/2008 | Keuschnigg | |
| 6,217,637 B1 | 4/2001 | Toney et al. | 7,435,290 B2 | 10/2008 | Lane et al. | |
| 6,227,379 B1 | 5/2001 | Nesseth | 7,445,653 B2 | 11/2008 | Trautmann et al. | |
| 6,277,278 B1 | 8/2001 | Conrad et al. | 7,470,299 B2 | 12/2008 | Han et al. | |
| 6,312,021 B1 | 11/2001 | Thomas | 7,473,083 B2 | 1/2009 | Oh et al. | |
| 6,314,738 B1 | 11/2001 | Hays | 7,479,171 B2 | 1/2009 | Cho et al. | |
| 6,372,006 B1 | 4/2002 | Pregenzer et al. | 7,494,523 B2 | 2/2009 | Oh et al. | |
| 6,375,437 B1 | 4/2002 | Nolan | 7,501,002 B2 | 3/2009 | Han et al. | |
| 6,383,262 B1 | 5/2002 | Marthinsen et al. | 7,520,210 B2 | 4/2009 | Theodore, Jr. et al. | |
| 6,394,764 B1 | 5/2002 | Samurin | 7,575,422 B2 | 8/2009 | Bode et al. | |
| 6,398,973 B1 | 6/2002 | Saunders et al. | 7,578,863 B2 | 8/2009 | Becker et al. | |
| 6,402,465 B1 | 6/2002 | Maier | 7,591,882 B2 | 9/2009 | Harazim | |
| 6,426,010 B1 | 7/2002 | Lecoffre et al. | 7,594,941 B2 | 9/2009 | Zheng et al. | |
| 6,464,469 B1 | 10/2002 | Grob et al. | 7,594,942 B2 | 9/2009 | Polderman | |
| 6,467,988 B1 | 10/2002 | Czachor et al. | 7,604,676 B2 * | 10/2009 | Braziunas | 55/385.3 |
| 6,468,426 B1 | 10/2002 | Klass | 7,610,955 B2 | 11/2009 | Irwin, Jr. | |
| 6,485,536 B1 | 11/2002 | Masters | 7,628,836 B2 | 12/2009 | Baronet et al. | |
| 6,530,484 B1 | 3/2003 | Bosman | 7,637,699 B2 | 12/2009 | Albrecht | |
| 6,530,979 B2 | 3/2003 | Firey | 7,674,377 B2 | 3/2010 | Carew | |
| 6,531,066 B1 | 3/2003 | Saunders et al. | 7,677,308 B2 | 3/2010 | Kolle | |
| 6,537,035 B2 | 3/2003 | Shumway | 7,708,537 B2 | 5/2010 | Bhatia et al. | |
| 6,540,917 B1 | 4/2003 | Rachels et al. | 7,708,808 B1 | 5/2010 | Heumann | |
| 6,547,037 B2 | 4/2003 | Kuzdzal | 7,744,663 B2 | 6/2010 | Wallace | |
| 6,592,654 B2 | 7/2003 | Brown | 7,748,079 B2 | 7/2010 | McDowell et al. | |
| 6,596,046 B2 | 7/2003 | Conrad et al. | 7,766,989 B2 | 8/2010 | Lane et al. | |
| 6,599,086 B2 | 7/2003 | Soja | 7,811,344 B1 | 10/2010 | Duke et al. | |
| 6,607,348 B2 | 8/2003 | Jean | 7,811,347 B2 | 10/2010 | Carlsson et al. | |
| 6,616,719 B1 | 9/2003 | Sun et al. | 7,815,415 B2 | 10/2010 | Kanezawa et al. | |
| 6,617,731 B1 | 9/2003 | Goodnick | 7,824,458 B2 | 11/2010 | Borgstrom et al. | |
| 6,629,825 B2 | 10/2003 | Stickland et al. | 7,824,459 B2 | 11/2010 | Borgstrom et al. | |
| 6,631,617 B1 | 10/2003 | Dreiman et al. | 7,846,228 B1 | 12/2010 | Saaski et al. | |
| 6,658,986 B2 | 12/2003 | Pitla et al. | 2001/0007283 A1 | 7/2001 | Johal et al. | |
| 6,659,143 B1 | 12/2003 | Taylor et al. | 2002/0009361 A1 | 1/2002 | Reichert et al. | |
| 6,669,845 B2 | 12/2003 | Klass | 2003/0029318 A1 | 2/2003 | Firey | |
| 6,688,802 B2 | 2/2004 | Ross et al. | 2003/0035718 A1 | 2/2003 | Langston et al. | |
| 6,707,200 B2 | 3/2004 | Carroll et al. | 2003/0136094 A1 | 7/2003 | Illingworth et al. | |
| 6,718,955 B1 | 4/2004 | Knight | 2004/0007261 A1 | 1/2004 | Cornwell | |
| 6,719,830 B2 | 4/2004 | Illingworth et al. | 2004/0170505 A1 | 9/2004 | Lenderink et al. | |
| 6,764,284 B2 | 7/2004 | Oehman, Jr. | 2005/0173337 A1 | 8/2005 | Costinel | |
| 6,776,812 B2 | 8/2004 | Komura et al. | 2006/0065609 A1 | 3/2006 | Arthur | |
| 6,802,693 B2 | 10/2004 | Reinfeld et al. | 2006/0090430 A1 | 5/2006 | Trautman et al. | |
| 6,802,881 B2 | 10/2004 | Illingworth et al. | 2006/0096933 A1 | 5/2006 | Maier | |
| 6,811,713 B2 | 11/2004 | Arnaud | 2006/0157251 A1 | 7/2006 | Stinessen et al. | |
| 6,817,846 B2 | 11/2004 | Bennitt | 2006/0157406 A1 | 7/2006 | Maier | |
| 6,837,913 B2 | 1/2005 | Schilling et al. | 2006/0193728 A1 | 8/2006 | Lindsey et al. | |
| 6,843,836 B2 | 1/2005 | Kitchener | 2006/0222515 A1 | 10/2006 | Delmotte et al. | |
| 6,878,187 B1 | 4/2005 | Hays et al. | 2006/0230933 A1 | 10/2006 | Harazim | |
| 6,893,208 B2 | 5/2005 | Frosini et al. | 2006/0239831 A1 | 10/2006 | Garris, Jr. | |
| 6,907,933 B2 | 6/2005 | Choi et al. | 2006/0254659 A1 | 11/2006 | Ballot et al. | |
| 6,979,358 B2 | 12/2005 | Ekker | 2006/0275160 A1 | 12/2006 | Leu et al. | |
| 7,001,448 B1 | 2/2006 | West | 2007/0029091 A1 | 2/2007 | Stinessen et al. | |
| 7,013,978 B2 | 3/2006 | Appleford et al. | 2007/0036646 A1 | 2/2007 | Nguyen et al. | |
| 7,022,150 B2 | 4/2006 | Borgstrom et al. | 2007/0051245 A1 | 3/2007 | Yun | |
| 7,022,153 B2 | 4/2006 | McKenzie | 2007/0062374 A1 | 3/2007 | Kolle | |
| 7,025,890 B2 | 4/2006 | Moya | 2007/0065317 A1 | 3/2007 | Stock | |
| 7,033,410 B2 | 4/2006 | Hilpert et al. | 2007/0084340 A1 | 4/2007 | Dou et al. | |
| 7,033,411 B2 | 4/2006 | Carlsson et al. | 2007/0140870 A1 | 6/2007 | Fukanuma et al. | |
| 7,056,363 B2 | 6/2006 | Carlsson et al. | 2007/0151922 A1 | 7/2007 | Mian | |
| 7,063,465 B1 | 6/2006 | Wilkes et al. | 2007/0163215 A1 | 7/2007 | Lagerstadt | |
| 7,112,036 B2 | 9/2006 | Lubell et al. | 2007/0172363 A1 | 7/2007 | Laboube et al. | |
| 7,131,292 B2 | 11/2006 | Ikegami et al. | 2007/0196215 A1 | 8/2007 | Frosini et al. | |
| 7,144,226 B2 | 12/2006 | Pugnet et al. | 2007/0227969 A1 | 10/2007 | Dehaene et al. | |
| 7,159,723 B2 | 1/2007 | Hilpert et al. | 2007/0294986 A1 | 12/2007 | Beetz | |
| 7,160,518 B2 | 1/2007 | Chen et al. | 2008/0031732 A1 | 2/2008 | Peer et al. | |
| 7,169,305 B2 | 1/2007 | Gomez | 2008/0039732 A9 | 2/2008 | Bowman | |
| 7,185,447 B2 | 3/2007 | Arbeiter | 2008/0246281 A1 | 10/2008 | Agrawal et al. | |

| | | | |
|---|---|---|---|
| 2008/0315812 A1 | 12/2008 | Balboul | |
| 2009/0013658 A1 | 1/2009 | Borgstrom et al. | |
| 2009/0015012 A1 | 1/2009 | Metzler et al. | |
| 2009/0025562 A1 | 1/2009 | Hallgren et al. | |
| 2009/0025563 A1 | 1/2009 | Borgstrom et al. | |
| 2009/0151928 A1 | 6/2009 | Lawson | |
| 2009/0159523 A1 | 6/2009 | McCutchen | |
| 2009/0169407 A1 | 7/2009 | Yun | |
| 2009/0173095 A1 | 7/2009 | Bhatia et al. | |
| 2009/0266231 A1 | 10/2009 | Franzen et al. | |
| 2009/0304496 A1 | 12/2009 | Maier | |
| 2009/0321343 A1 | 12/2009 | Maier | |
| 2009/0324391 A1 | 12/2009 | Maier | |
| 2010/0007133 A1 | 1/2010 | Maier | |
| 2010/0021292 A1 | 1/2010 | Maier et al. | |
| 2010/0038309 A1 | 2/2010 | Maier | |
| 2010/0043288 A1 | 2/2010 | Wallace | |
| 2010/0043364 A1 | 2/2010 | Curien | |
| 2010/0044966 A1 | 2/2010 | Majot et al. | |
| 2010/0072121 A1 | 3/2010 | Maier | |
| 2010/0074768 A1 | 3/2010 | Maier | |
| 2010/0083690 A1 | 4/2010 | Sato et al. | |
| 2010/0090087 A1 | 4/2010 | Maier | |
| 2010/0143172 A1 | 6/2010 | Sato et al. | |
| 2010/0163232 A1 | 7/2010 | Kolle | |
| 2010/0183438 A1 | 7/2010 | Maier et al. | |
| 2010/0239419 A1 | 9/2010 | Maier et al. | |
| 2010/0239437 A1 | 9/2010 | Maier | |
| 2010/0247299 A1 | 9/2010 | Maier | |
| 2010/0257827 A1 | 10/2010 | Lane et al. | |
| 2011/0017307 A1 | 1/2011 | Kidd et al. | |
| 2011/0061536 A1 | 3/2011 | Maier et al. | |

FOREIGN PATENT DOCUMENTS

| | | |
|---|---|---|
| EP | 1582703 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 2004034017 A | 2/2004 |
| JP | 3711028 | 10/2005 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Dresser-Rand, Inc. "High Pressure Air Compressor Model 13NL45," Oct. 28, 1991, 14 pages.
Technical Manual—High Pressure Air Compressor Model 13NL45, Navsea S6220-AT-MMA-010/93236, pp. 3-23 to 3-32, Electric Boat Corporation, Groton, CT 06340, Oct. 28, 1991.

* cited by examiner

DENSITY-BASED COMPACT SEPARATOR

CROSS REFERENCE TO RELATED APPLICATIONS

This application claims priority to U.S. Provisional Patent Application Ser. No. 61/242,645, which was filed Sep. 15, 2009. This priority application is hereby incorporated by reference in its entirety into the present application, to the extent that it is not inconsistent with the present application.

BACKGROUND

In compression systems, a multiphase fluid is usually separated into phases prior to compression so that appropriate machinery and processes may be used on the respective phases. For example, a compressor may be suitable for a gaseous portion of the multiphase fluid but unsuitable for a liquid portion. To effect separation of gaseous materials from liquids, rotary separators may be used.

In some compression systems, however, the multiphase fluid may arrive at an inlet of the compression system containing more particulate matter, liquid phase, or other types of contaminants, than the rotary separator is designed to handle. Further, it may be desirable to have multiple passes at separating the multiphase fluid. In such cases, the compression systems may employ an array of swirl tubes to perform the first separation. The array of swirl tubes, however, introduces head loss into the compression system and generally requires a large number of swirl tubes to be effective, increasing the size, complexity, and therefore cost, and maintenance requirements of the compression system. Thus, what is needed is a compact density-based separator that does not suffer from the head losses or other drawbacks of the swirl tube arrays.

SUMMARY

Embodiments of the disclosure may provide an apparatus for separating a fluid. The apparatus may include an inlet duct having an inlet flow entrance and an inlet flow exit, the inlet duct defining an inlet width that decreases between the inlet flow entrance and the inlet flow exit, and an inlet radius that increases between the inlet flow entrance and the inlet flow exit. The apparatus may also include a separating turn fluidly connected to the inlet flow exit of the inlet duct and including an outer surface defining an opening. The apparatus may further include a liquid outlet fluidly connected to the opening of the separating turn to allow a higher-density component of the fluid to exit the separating turn, and an outlet duct having an outlet flow entrance connected to the separating turn, to allow a lower-density component of the fluid to exit the separating turn.

Embodiments of the disclosure may also provide a static separator apparatus for separating a higher-density component of a fluid from a lower-density component of the fluid. The static separator apparatus includes a separating turn disposed around a centerline and having an inlet, a gas outlet, and an outer surface extending therebetween and defining openings therein. The static separator apparatus also includes a liquid outlet fluidly coupled to the openings, the liquid outlet configured to receive at least some of the higher-density component and an expelled amount of the lower-density component from the separating turn via the openings. The static separator apparatus further includes a gas return channel extending from the liquid outlet and intersecting the separating turn, the gas return channel configured to shunt at least some of the expelled amount of the lower-density component from the liquid outlet back to the separating turn.

Embodiments of the disclosure may further provide a method for separating a higher-density component from a lower-density component of a fluid. The method may include channeling the fluid through a separating turn disposed between an inlet duct and an outlet duct of a separator, and expelling at least some of the higher-density component and at least some of the lower-density component through openings in the separating turn. The method may also include shunting the portion of the lower-density component expelled through the openings back into the separating turn, and maintaining a substantially constant cross-sectional area of the flow in at least in the inlet duct and the separating turn.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
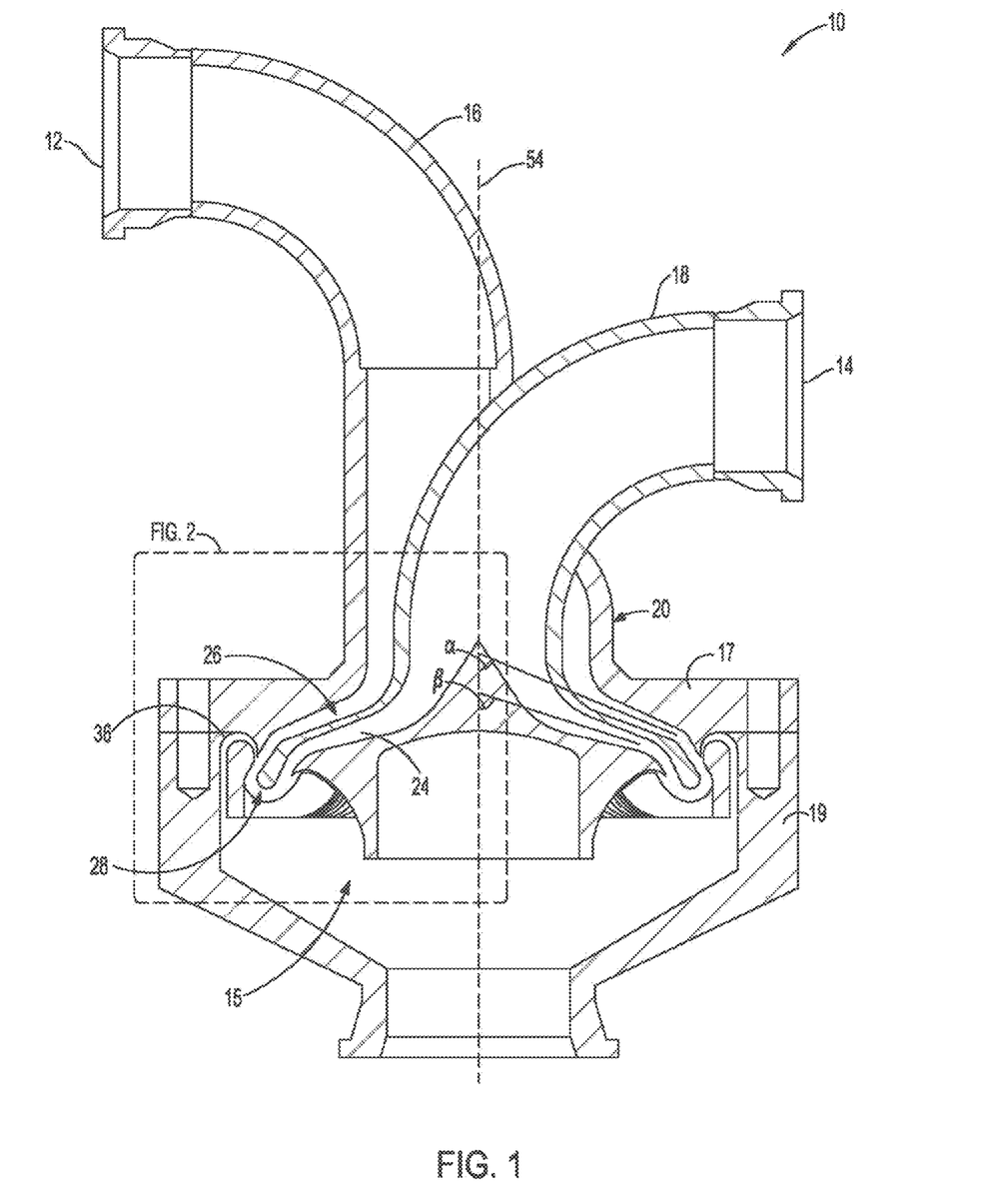
FIG. 1 illustrates a cross-sectional view of an exemplary separator, in accordance with the disclosure.

FIG. 1 illustrates a cross-sectional view of an exemplary separator 10, according to one or more embodiments. The exemplary separator 10 is a compact static separator and includes a process fluid inlet 12, a process fluid outlet 14, and a liquid outlet 15. The process fluid inlet 12 is connected to an external pipe (not shown) or other type of conduit that connects to a source of process fluid (not shown). The process fluid outlet 14 may be connected to another external pipe or other conduit and, for example, eventually to a rotary separator of a compression system (not shown). In other exemplary embodiments, however, the process fluid outlet 14 may be connected to or be upstream from any other structures and/or devices. The process fluid inlet 12 may be fluidly connected to an inlet conduit 16, which may also be referred to herein as an inlet pipe, and the process fluid outlet 14 may be fluidly connected to an outlet conduit 18, which may also be referred to herein as an outlet pipe. It will be appreciated that the term "pipe" is not necessarily limited to a structure having a circular cross-section, and other cross-sections are contemplated herein.

In at least one exemplary embodiment, the inlet pipe 16 and the outlet pipe 18 may be removable and may include a top 17 attached to a base 19. The top 17 may be mechanically fastened to the base 19 and may include a gasket or other sealing member (not shown). In other exemplary embodiments, the top 17 may be fixed to the base 19 by, for example, welding or other attachment processes and/or devices. Further, in at least one exemplary embodiment, the inlet pipe 16 and the outlet pipe 18 may be disposed such that a portion of the outlet pipe 18 may be located inside the inlet pipe 16, as shown. As also shown, the outlet pipe 18 may curve from vertical to horizontal, and may exit out of the inlet pipe 16 and connect to an external structure, as described above. It will be appreciated that directional terms such as "vertical," "horizontal," "above," "below," "to the side," and the like refer merely to relative positioning and/or orientation and are not meant to be limiting to this disclosure.

In other exemplary embodiments, the inlet pipe 18 may be disposed inside the outlet pipe 18. Disposing one of the outlet pipe 18 and the inlet pipe 16 inside the other may have the useful advantage of reducing the overall size of the separator 10. However, exemplary embodiments in which the outlet pipe 18 extends away from the inlet pipe 16, for example, in the opposite direction as the inlet pipe 16, are contemplated herein.

Further, in an exemplary embodiment, the liquid outlet 15 may be disposed below the inlet and outlet pipes 16, 18 to allow gravity to drain portions separated out from a fluid flow. In another exemplary embodiment, the liquid outlet 15 may be disposed above or to the side of the inlet and outlet pipes 16, 18, and may employ other means of drainage, such as auxiliary pumps and/or an integral gas-break vessel with a liquid level control system (not shown).

Moreover, the inlet pipe 16 may include a bulge 20 where the inlet pipe 16 has an enlarged radius. The inlet pipe 16 may contain a portion of the outlet pipe 18 in the bulge 20, such that in horizontal cross-section, the unobstructed area of the inlet pipe 16 remains substantially constant, despite the partial obstruction by the outlet pipe 18. "Substantially constant" as it is used herein to refer to areas is generally defined to mean tolerating variances of less than or equal to about +1-10%.

The separator 10 generally includes an outlet duct 24, an inlet duct 26, and a separating turn 28, which together define a main flow path of the separator 10. In an exemplary embodiment, the main flow path may be substantially axisymmetric about a centerline 54, and may also have a substantially constant cross-sectional flow area, as described in greater detail below with reference to FIG. 2.

The inlet pipe 16 may be fluidly connected to the inlet duct 26 as shown. The inlet duct 26 may be substantially axisymmetric and may bend or turn away from the centerline 54 near where the inlet duct 26 is connected with the inlet pipe 16 and may then become frustoconical in shape around the centerline 54. The inlet duct 26 may also have an annular inlet duct cross-section and may be oriented at an angle α away from the centerline 54 of the separator 10. In an exemplary embodiment, the angle α may be between about 60 degrees and about 80 degrees relative to the centerline 54, between about 65 degrees and about 75 degrees relative to the centerline 54, or about 70 degrees relative to the centerline 54.

The inlet duct 26 may be upstream from and fluidly connected to the separating turn 28, which will be described in greater detail with reference to FIGS. 2 and 3. The separating turn 28 may be approximately a 180 degree turn, and may be axisymetric about the centerline 54. Further, the separating turn 28 may be at least partially toroidal in shape around the centerline 54. Additionally, the separator 10 may include a gas return channel 36, which fluidly connects the liquid outlet 15 to the separating turn 28 proximate the inlet duct 26.

The outlet duct 24 may be downstream from and fluidly connected to the separating turn 28. The outlet duct 24 may have an annular outlet duct cross-section and may be frustoconically shaped around the centerline 54, similar to the inlet duct 26, until it bends to meet the outlet pipe 18. The outlet duct 24 may be disposed at an angle β with respect to the centerline 54, which may be substantially equal to the angle α, such that portions the inlet and outlet ducts 26, 24 are substantially parallel; however, in other exemplary embodiments, the angle β may be greater or lesser than the angle α. For example, the angle β may be between about 65 degrees and about 85 degrees relative to the centerline 54. Further, the inlet and outlet ducts 26, 24 may be at least partially concentric, or substantially so, to each other. As can be appreciated, the concentric arrangement may provide the advantage of reducing the overall size of the separator 10.

Figure 2:
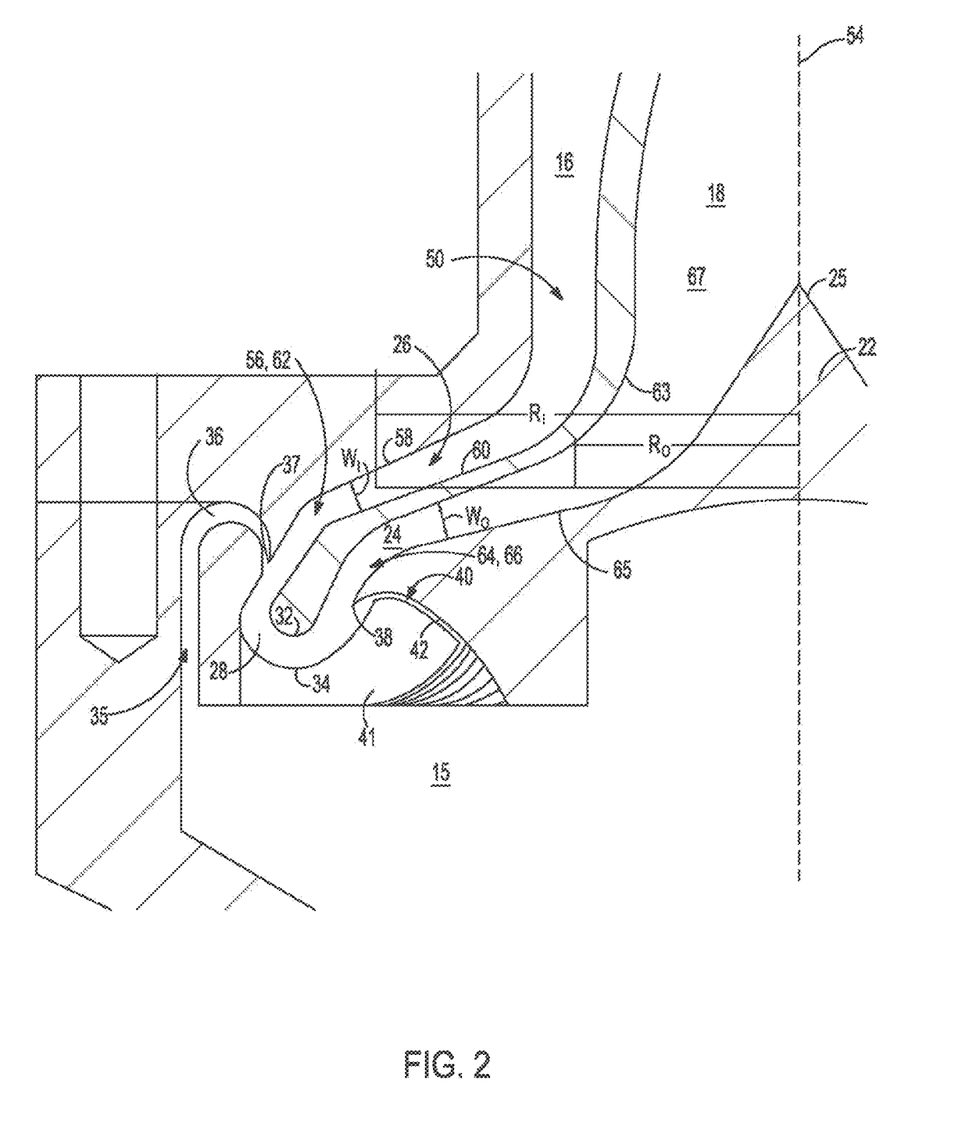
FIG. 2 illustrates an enlarged view of a portion of FIG. 1.

FIG. 2 illustrates an enlarged portion of FIG. 1, as indicated by the dashed box in FIG. 1. The inlet duct 26 has an inlet fluid entrance 50 that may be connected to the inlet pipe 16 and an inlet fluid exit 56 that may be connected to the separating turn 28. Further, the inlet duct 26 may have an outer wall 58 and an inner wall 60, which are spaced apart. The distance between the outer and inner walls 58, 60, may define an inlet width $W_I$. At any given horizontal cross-section, the inlet duct 26 may further define an inlet radius $R_I$, with the inlet radius $R_I$ being the distance from the centerline 54 to the center of the inlet duct 26. As illustrated, the inlet width $W_I$ may decrease from a maximum at the inlet fluid entrance 50 to a minimum at the inlet fluid exit 56. Further, the inlet radius $R_I$ may vary inversely with the inlet width $W_I$, such that the inlet radius $R_I$ increases as the inlet width $W_I$ decreases. The inlet radius $R_I$ may have a maximum inlet radius $R_I$ at the inlet fluid exit 56 and a minimum inlet radius $R_I$ at the inlet fluid entrance 50. Accordingly, the cross-sectional area through which a fluid may flow, i.e., the flow area, of the inlet duct 26 may remain substantially constant. Further, the inlet duct 26 may extend at the angle α, as described with reference to FIG. 1, until the inlet radius $R_I$ reaches a desired length, which may be, for example, three times the nominal radius of the inlet pipe 16, at which point the inlet fluid exit 56 of the inlet duct 26 may be connected to the separating turn 28.

The separating turn 28 may be fluidly connected to the inlet duct 26 at an inlet end 62, and may have a gas outlet end 64 that is connected to an outlet fluid entrance 66 of the outlet duct 24. Between the inlet end 62 and the gas outlet end 64, the separating turn 28 may include an inner surface 32 and an outer surface 34, with an outer body 41 of the separator 10 providing the outer surface 34.

The gas return channel 36 may be formed around the outside of the separating turn 28, such that the separating turn 28 may be disposed between the gas return channel 36 and the centerline 54. The gas return channel 36 may include a passageway 35, which may be at least partially toroidal around the outside of the separating turn 28 and may terminate at an injection interface 37. The injection interface 37 is fluidly connected to the separating turn 28, proximate the inlet end 62. In an exemplary embodiment, the gas return channel 36 fluidly connects the liquid outlet 15 to the separating turn 28, and the injection interface 37 is a convergent nozzle or an ejector, to aid in redirecting of an outflow of gas, as described below.

The separating turn 28 may further include an auxiliary liquid outlet channel 40, which may include a lip 38 extending from the outer surface 34 toward the inner surface 32 and located proximate the gas outlet end 64 of the separating turn 28. The auxiliary liquid outlet channel 40 may also include a liquid passageway 42, which may extend, for example, through the outer body 41 to the liquid outlet 15, thereby fluidly connecting the lip 38 with the liquid outlet 15.

The gas outlet end 64 of the separating turn 28 may be connected to the outlet fluid entrance 66 of the outlet duct 24. In an exemplary embodiment, the outlet duct 24 may be formed similarly to the inlet duct 26. Accordingly, the outlet duct 24 may have an outlet fluid exit 67 connected to the outlet pipe 18, and an interior wall 65. The interior wall 65 may be defined by a radial flow expander 22, which may form a flow expander peak 25 where a flow of fluid through the outlet duct 24 flows out into the outlet pipe 18, thereby changing from a flow path with a ring-shaped cross-section to one with a circular cross-section. In an exemplary embodiment in which the inlet duct 26 is inside the outlet duct 24, the radial flow expander 22 may be formed in the inlet duct 26, such that it defines the inner wall 60 of the inlet duct 26. In such an embodiment, the flow expander peak 25 may form the beginning of the change in the shape of the cross-section of the fluid flow from circular in the inlet pipe 16 to ring-shaped in the inlet duct 26.

The interior wall 65 may be spaced apart from an exterior wall 63 of the outlet duct 24 to define an outlet duct width $W_O$. The outlet duct width $W_O$ may increase from a minimum outlet duct width $W_O$ at the outlet fluid entrance 66, to a maximum outlet width $W_O$ at the outlet fluid exit 67. Additionally, the distance from the centerline 54 to the middle of the outlet duct 24 may define an outlet duct radius $R_o$ at any given horizontal cross-section. In an exemplary embodiment, the outlet duct radius $R_O$ may decrease from the outlet fluid entrance 66 to the outlet fluid exit 67 in inverse proportion to the increasing outlet width $W_O$, such that the horizontal cross-section of the flow area of the outlet duct 24 remains substantially constant throughout.

Figure 3:
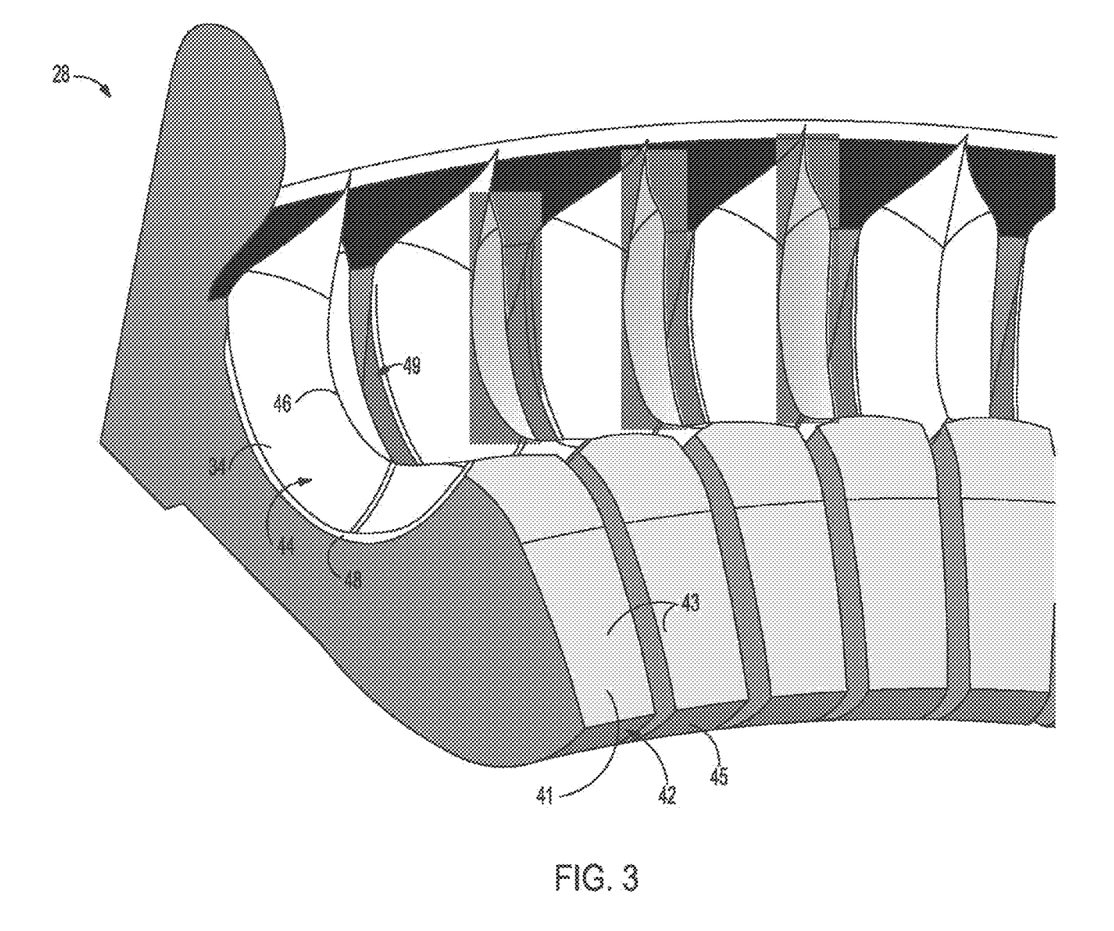
FIG. 3 illustrates a partial, broken-away isometric view of an exemplary separating turn, in accordance with the disclosure.

Referring now to FIG. 3, there is shown a raised perspective view of the outer surface 34 and the outer body 41 of the separating turn 28. In an exemplary embodiment, the outer surface 34 has a V-shaped or scalloped region 44. The scalloped region 44 may have a peak 46 and a valley 48 defined therein. The peak 46 may engage the inner surface 32 (not shown) and may aid in the support of the outlet duct 24 (not shown). In other exemplary embodiments, however, the peak 46 may not engage the inner surface 32. The valley 48 may have an opening 49, or slot, defined therein. The opening 49 may extend through the outer body 41 to the liquid passageway 42, thereby dividing the outer body 41 into finger-like projections 43. In another exemplary embodiment, however, the opening 49 may be distinct from the liquid passageway 42. The liquid passageway 42 may extend around the edge 45 of the outer body 41, to the liquid outlet 15. The opening 49 may also extend through the outer body 41, thereby fluidly connecting the outer surface 32 with the liquid outlet 15.

In an exemplary embodiment, the outer surface 34 may include a plurality of the scalloped or V-shaped regions 44, defined at intervals around the separating turn 28. A plurality of peaks 46 and a plurality of valleys 48 may each be defined in the outer surface 34, wherein each of the plurality of valleys 48 is defined between two of the plurality of peaks 46, as shown. Further, in each of the plurality of valleys 48, one or more of the openings 49 may be defined with one, a few, or all of the openings 49 fluidly connecting the outer surface 34 with the liquid outlet 15.

In exemplary operation, with reference to FIGS. 1 and 2, a multiphase fluid flows through the process fluid inlet 12 and into the inlet pipe 16. The multiphase fluid may be characterized by a higher-density component, which may be referred to herein as "liquid," and a lower-density component, which may be referred to herein as "gas," with it being desirable to separate the two components. It will be appreciated that, despite the naming convention chosen herein for the two components, the higher-density component may additionally contain solids and/or relatively dense gases, and the lower-density component may additionally include relatively light liquids and/or solids. Accordingly, the separator 10 may separate any higher-density component from any lower-density component.

In an exemplary embodiment, to maintain a relatively fixed magnitude of the meridional velocity of the flow of the multiphase fluid, the radius of the inlet pipe 16 enlarges at the bulge 20 to account for the partial obstruction by the outlet pipe 18, thereby maintaining a substantially constant cross-sectional flow area. The multiphase fluid then flows into the inlet duct 26, where the cross-sectional flow area continues to remain substantially constant, despite the decreasing inlet width $W_I$ due to the increasing inlet radius $R_I$. At the inlet fluid exit 56, the width of the flow of multiphase fluid, as defined by the inlet width $W_I$, has decreased to the point where the flow of multiphase fluid is a relatively thin sheet.

The flow of multiphase fluid is then directed through the separating turn 28, which may be a relatively sharp turn. The coefficient of head loss is related to the ratio of the width of the multiphase fluid flow to the radius of the separating turn 28. Reducing the width $W_I$ of the flow in the inlet duct 26 may therefore reduce the coefficient of head loss and/or allow for a smaller radius of the separating turn 28. In an exemplary embodiment, the coefficient of head loss in the separating turn 28 may be approximately 0.74, or in other words, approaching the head loss caused by an ordinary long-sweep elbow.

Unlike an ordinary long-sweep elbow, however, the inertial force felt by the multiphase fluid flow in the separating turn 28 may be, for example, about 1800 times the force of gravity, which will generally be sufficient to separate out the liquid from the multiphase flow. It will be appreciated, however, that the separator 10 may be designed such that other levels of inertial force may be attained. The inertial force may force the liquid toward the outer surface 34 of the separating turn 28, where it may then be expelled through the openings 49 defined in the outer surface 34, through the outer body 41. Once expelled, the liquid may be channeled away from the separating turn 28 by the liquid outlet 15, using gravity or alternative means for draining the liquid, as described above with reference to FIG. 1.

As the liquid (and/or any other higher-density components of the flow) is centrifugally expelled through the openings 49, the scalloped or V-shaped regions 44 (see FIG. 3) channel the gas through the separating turn 28 toward the gas outlet end 64. The scalloped regions 44 may additionally prevent backflow of the gas through the inlet end 62. In some cases, a film of the liquid may be pushed, despite the centrifugal force, by the gas along the outer surface 34 and toward the gas outlet end 64. In an exemplary embodiment including the auxiliary liquid outlet channel 40, as shown in FIG. 2, the film may be collected by the lip 38 before the liquid exits through the gas outlet end 64. The liquid may then drain out through the liquid passageway 42 and through the liquid outlet 15, pushed along by gravity or additional devices, as described above.

Some of the gas that is intended to exit through the gas outlet end 64 may be centrifugally expelled through the openings 49 along with the liquid. In fact, this may be an advantageous occurrence, as it may aid in channeling the liquid through the openings 49. The gas return channel 36 may be configured to return all or a portion of the gas that escapes through the openings 49. In exemplary operation, the flow of multiphase fluid past the injection interface 37 may create a decreased static pressure at the injection interface 37, which may create a pressure gradient in the passageway 35. This may act to siphon the gas expelled through the openings 49 into the liquid outlet 15 back through the passageway 35 and into the separating turn 28 proximate the inlet end 62, thereby shunting the outflow of gas back into the flow of multiphase fluid. In an exemplary embodiment, the gas return channel 36 may be configured to return or shunt about 5% or more of the total amount of gas that proceeds into the separating turn 28. Additionally, the liquid outlet 15 may include plates or other coalescing media (none shown) to restrain the liquid in the liquid outlet 15 from migration into the gas return channel 36.

After passing through the separating turn 28, the multiphase fluid may be made up of an increased percentage of gas and a reduced percentage of liquid, thus having an overall reduced density. However, to maintain the desired low loss coefficient described above, the cross-section of the multiphase fluid flow may be kept at a substantially constant size. Thus, as the outlet radius $R_O$ decreases, the outlet width $W_O$ may increase to compensate and to maintain the substantially constant cross-sectional flow area, until the outlet duct 24 connects to the outlet pipe 18. The flow of multiphase fluid may then exit the separator 10 via the outlet pipe 18, through the process fluid outlet 14 and, for example, to a rotary separator and/or a compressor.

Figure 4:
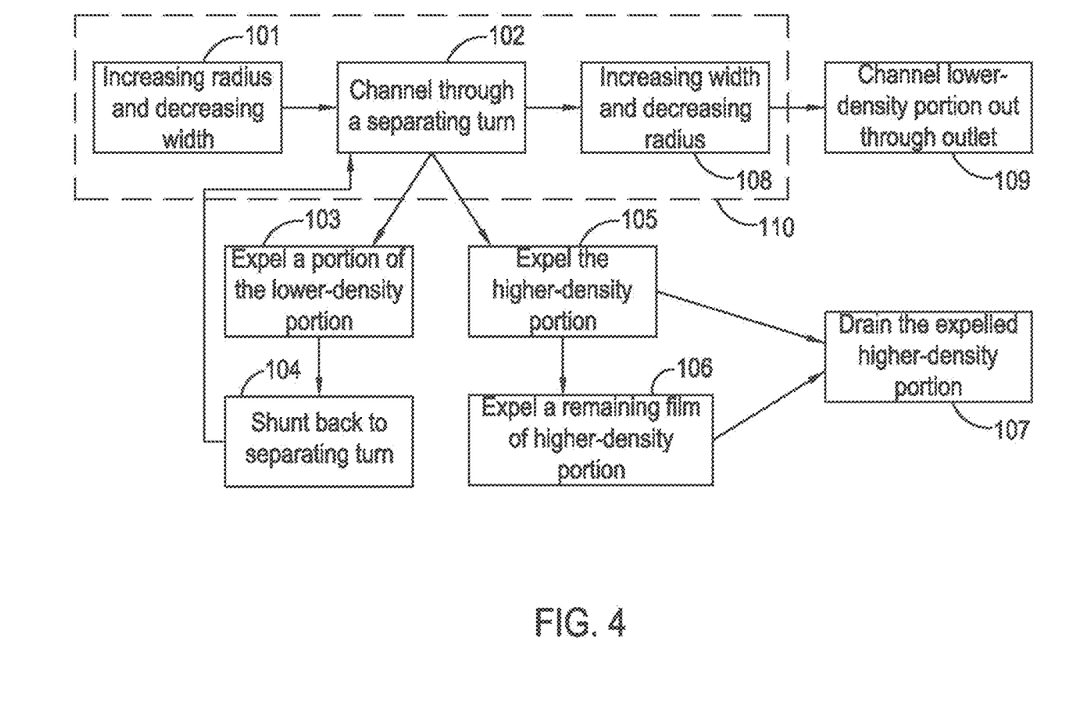
FIG. 4 illustrates a flowchart of an exemplary method for separating a flow of fluid, in accordance with the disclosure.

FIG. 4 illustrates an exemplary method of separating a flow of multiphase fluid into a higher-density component and a lower-density component. The method of FIG. 4 may proceed by operation of an exemplary embodiment of the separator 10 shown in and described above with reference to FIGS. 1-3, or separators similar thereto. The flow of multiphase fluid may define an annular cross-section, as determined by the shape of an inlet conduit through which the flow of multiphase fluid may be channeled. The annular cross-section may have a radius that increases and a width that decreases before the flow of multiphase fluid encounters a separating turn, shown at 101. As such, the flow of multiphase fluid may expand radially, while thinning in width, so that it becomes a thin sheet proximate the separating turn, thereby allowing the radius of the separating turn to be small, while enabling the separating turn to produce minimal head loss, as described above.

The flow of multiphase fluid may be channeled through the separating turn, shown at 102. Once in the separating turn, a portion of the lower-density component may be expelled through openings in the separating turn, shown at 103. The expelled portion of the lower-density component may be shunted back to the separating turn, shown at 104, for example, by the gas return channel described above with reference to FIGS. 1 and 2. The separating turn also expels at least a portion, up to substantially all, of the higher-density component through the openings, shown at 105. There may, however, be a remaining film of the higher-density component left in the separating turn, even after the first expulsion. As such, the method may further include expelling the remaining film of the higher-density component, shown at 106, and may do so through an auxiliary liquid outlet channel such as that described above with reference to FIG. 2. The expelled higher-density component may then be drained, shown at 107, through a liquid outlet such as that described above with reference to FIGS. 1 and 2. Additionally, the method may include preventing backflow of the flow of multiphase fluid by channeling the flow of multiphase fluid through the separating turn with a scalloped region, as described above with reference to FIG. 3.

The lower-density component that is channeled through the separating turn may afterward be channeled through an outlet conduit. The outlet conduit may have an increasing width and decreasing radius, shown at 108. Once through the outlet conduit, the flow of multiphase fluid, having a reduced amount of the higher-density component, may proceed to other components of a compression system via an outlet, shown at 109.

While varying the radius and the width of the flow of multiphase fluid, shown at 101 and 108, and channeling it through the separating turn, shown at 102, the method may include maintaining a substantially constant cross-sectional area of the flow of multiphase fluid, shown at 110. This may maintain a relatively constant magnitude of the meridional velocity of the flow of multiphase fluid, and may have the advantage of minimizing head loss in the separating turn, as described above.

Accordingly, embodiments of the disclosure may provide a separator including an inlet duct having an inlet flow entrance, an inlet flow exit, an inlet width that decreases between the inlet flow entrance and the inlet flow exit, and an inlet radius that increases between the inlet flow entrance and the inlet flow exit; a separating turn fluidly connected to the inlet flow exit of the inlet duct and including an outer surface having a scalloped region, and an opening formed in the outer surface; a liquid outlet fluidly connected to the opening of the separating turn; and an outlet duct having an outlet flow entrance connected to the separating turn, an outlet flow exit, an outlet duct width that increases between the outlet flow entrance and the outlet flow exit, and an outlet duct radius that decreases between the outlet flow entrance and the outlet flow exit.

Embodiments of the disclosure may further provide the separator as described above, wherein the inlet duct has a substantially constant cross-sectional flow area, and/or wherein the inlet duct, the separating turn, and the outlet duct have a substantially constant cross-sectional flow area. Embodiments of the disclosure may also provide the separator as described above, wherein the opening of the separating turn is formed in the scalloped region, and/or the separator as described above, further including: an inlet conduit connected to the inlet duct; and an outlet conduit connected to the outlet duct and disposed at least partially in the inlet conduit. Embodiments of the disclosure may provide the separator as described above, further including an auxiliary liquid removal channel defined in the separating turn proximate the outlet duct and fluidly connected to the liquid outlet, and/or wherein the auxiliary liquid removal channel includes: a lip extending from the outer surface of the separating turn; and a liquid passageway extending from the outer surface and fluidly connected to the liquid outlet. Embodiments of the disclosure may also provide the separator as described above, further including a gas return channel fluidly connected to the liquid outlet and the separating turn, wherein the gas return channel is configured to shunt a flow of gas from the liquid outlet into the separating turn proximate the inlet duct.

Embodiments of the disclosure may also provide a separator, including: an inlet pipe; an inlet duct having an annular inlet duct cross-section and fluidly connected to the inlet pipe; a separating turn fluidly connected to the inlet duct and having a slot defined therein; an outlet duct having an annular outlet duct cross-section, fluidly connected to the separating turn, and disposed at least partially concentric with the inlet duct; and a liquid outlet fluidly connected to the slot of the separating turn. Embodiments of the disclosure may further provide the separator of as described above, wherein the inlet duct and the outlet duct are at least partially frustoconical about a centerline of the static separator, and the separating turn is at least partially toroidal about the centerline. Embodiments of the disclosure may also provide the separator as described above, wherein the inlet duct is disposed at an angle of between about 60 and about 80 degrees relative to the centerline, and/or wherein the separating turn includes an outer surface having a V-shaped region including a peak and a valley, and/or wherein the slot is formed in the valley of the V-shaped region. Embodiments of the disclosure may further provide the separator as described above, further including: an outer body providing an outer surface of the separating turn; and an auxiliary liquid removal channel including a lip extending from the outer surface of the separating turn proximate the outlet duct, and a liquid passageway extending from the lip, through the outer body, and fluidly connected to the liquid outlet. Embodiments of the disclosure may also provide the separator as described above, further including a gas return channel fluidly connected with the liquid outlet and the separating turn proximal the inlet duct.

Embodiments of the disclosure may additionally provide a method of separating a flow of multiphase fluid into a higher-density component and a lower-density component, including: channeling the flow of multiphase fluid through a separating turn; expelling at least a portion of the higher-density component and a portion of the lower-density component through openings in the separating turn; shunting the portion of the lower-density component expelled through the openings back into the separating turn; and maintaining a substantially constant cross-sectional area of the flow of multiphase fluid. Embodiments of the disclosure may provide the method as described above, further including expelling a film of the higher-density component from the separating turn through an auxiliary liquid outlet channel, and/or wherein channeling the flow of multiphase fluid further includes preventing backflow of the lower-density component with a scalloped region formed in the separating turn. Embodiments of the disclosure may additionally provide the method as described above, wherein maintaining the substantially constant cross-sectional area includes: increasing a radius of the flow of multiphase fluid and decreasing a width of the flow of multiphase fluid before the separating turn; and decreasing the radius and increasing the width after the separating turn, and/or wherein channeling the flow of multiphase fluid further includes: channeling the flow of multiphase fluid to the separating turn through an inlet duct; channeling the flow of multiphase fluid from the separating turn through an outlet duct; and disposing the inlet duct at least partially concentric to the outlet duct.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for separating a fluid, comprising:
   an inlet duct having an inlet flow entrance and an inlet flow exit, the inlet duct defining an inlet width that decreases between the inlet flow entrance and the inlet flow exit, and an inlet radius that increases between the inlet flow entrance and the inlet flow exit;
   a separating turn fluidly connected to the inlet flow exit of the inlet duct and including an outer surface defining an opening;
   a liquid outlet fluidly connected to the opening of the separating turn to allow a higher-density component of the fluid to exit the separating turn; and
   an outlet duct having an outlet flow entrance connected to the separating turn to allow a lower-density component of the fluid to exit the separating turn.

2. The apparatus of claim 1, wherein the inlet duct provides a substantially constant cross-sectional flow area.

3. The apparatus of claim 1, wherein the outlet duct further comprises an outlet flow exit, the outlet duct defining an outlet duct width that increases between the outlet flow entrance and the outlet flow exit, and an outlet duct radius that decreases between the outlet flow entrance and the outlet flow exit.

4. The apparatus of claim 3, wherein the inlet duct, the separating turn, and the outlet duct provide a substantially constant cross-sectional flow area.

5. The apparatus of claim 1, wherein the outer surface defines a scalloped region and the opening of the separating turn is located in the scalloped region.

6. The apparatus of claim 1, further comprising:
   an inlet conduit connected to the inlet duct; and
   an outlet conduit connected to the outlet duct and disposed at least partially in the inlet conduit.

7. The apparatus of claim 1, further comprising an auxiliary liquid removal channel defined in the separating turn proximate the outlet duct and fluidly connected to the liquid outlet.

8. The apparatus of claim 7, wherein the auxiliary liquid removal channel comprises:
- a lip extending from the outer surface of the separating turn; and
- a liquid passageway extending from the outer surface and fluidly connected to the liquid outlet.

9. The apparatus of claim 1, further comprising a gas return channel fluidly connected to the liquid outlet and the separating turn, wherein the gas return channel is configured to shunt a flow of gas from the liquid outlet into the separating turn proximate the inlet duct.

10. A static separator apparatus for separating a higher-density component of a fluid from a lower-density component of the fluid, comprising:
- a separating turn disposed around a centerline and having an inlet, a gas outlet, and an outer surface extending therebetween and defining openings therein;
- a liquid outlet fluidly coupled to the openings, the liquid outlet configured to receive at least some of the higher-density component and an expelled amount of the lower-density component from the separating turn via the openings; and
- a gas return channel extending from the liquid outlet and intersecting the separating turn, the gas return channel configured to shunt at least some of the expelled amount of the lower-density component from the liquid outlet back to the separating turn.

11. The static separator apparatus of claim 10, wherein the gas return channel includes a convergent nozzle located where the gas-return channel intersects the separating turn.

12. The static separator apparatus of claim 11, wherein the gas return channel intersects the separating turn proximal the inlet of the separating turn.

13. The static separator apparatus of claim 10, wherein about 5% of the lower-density component that enters the static separator apparatus is shunted in the gas return channel.

14. The static separator apparatus of claim 10, further comprising:
- a lip extending inward from the outer surface and positioned proximal the gas outlet of the separating turn; and
- a liquid passageway extending from the outer surface, proximal the lip, to the liquid outlet.

15. The static separator apparatus of claim 14, further comprising an outer body providing the outer surface of the separating turn, wherein the openings and the liquid passageway are at least partially defined by the outer body.

16. The static separator apparatus of claim 10, wherein:
- the outer surface of the separating turn comprises a V-shaped region including a peak and a valley; and
- the openings are formed in the valley of the V-shaped region.

17. A method for separating a higher-density component from a lower-density component of a fluid, comprising:
- channeling the fluid through a separating turn disposed between an inlet duct and an outlet duct of a separator;
- expelling at least some of the higher-density component and at least some of the lower-density component through openings in the separating turn;
- shunting the portion of the lower-density component expelled through the openings back into the separating turn; and
- maintaining a substantially constant cross-sectional area of the flow in at least in the inlet duct and the separating turn.

18. The method of claim 17, further comprising expelling a film of the higher-density portion from the separating turn through an auxiliary liquid outlet channel.

19. The method of claim 17, wherein channeling the flow further comprises preventing backflow of the lower-density component with a scalloped region formed in the separating turn.

20. The method of claim 17, wherein maintaining the substantially constant cross-sectional area comprises:
- increasing a radius of the fluid flow and decreasing a width of the fluid flow upstream from the separating turn; and
- decreasing the radius and increasing the width downstream from the separating turn.

\* \* \* \* \*